(12) United States Patent
Campbell et al.

(10) Patent No.: US 6,895,321 B2
(45) Date of Patent: May 17, 2005

(54) ANGULAR AND LINEAR FLEXURE PLATE ACCELEROMETER

(75) Inventors: Ray F. Campbell, Newport Beach, CA (US); Joan D. Wada, Anaheim, CA (US); John P. Raab, Placentia, CA (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 10/604,529

(22) Filed: Jul. 29, 2003

(65) Prior Publication Data

US 2005/0085983 A1 Apr. 21, 2005

(51) Int. Cl.[7] .................. G01P 15/125; G01C 19/00

(52) U.S. Cl. ................ 701/70; 701/1; 701/220; 73/504.02; 73/514.01; 73/514.32; 324/658

(58) Field of Search ................ 701/1, 70, 220; 73/504.02, 504.03, 504.08, 514.01, 514.02, 514.15, 514.32, 510; 324/658, 661; 702/52, 141

(56) References Cited

U.S. PATENT DOCUMENTS 5,415,040 A * 5/1995 Nottmeyer ............... 73/514.02
5,495,414 A * 2/1996 Spangler et al. ............ 701/45

* cited by examiner

Primary Examiner—Tan Q. Nguyen
(74) Attorney, Agent, or Firm—Artz & Artz, PC

(57) ABSTRACT

An accelerometer system includes a rigid plate system coupled to an inertial platform. A first flexure plate defines a first flex axis and is adjacent to the rigid plate system a first distance from the spin axis. The first flexure plate generates a first frequency signal in response to acceleration of the first flexure plate. A second flexure plate defines a second flex axis and is adjacent to the rigid plate system a second distance from the spin axis. The second flexure plate generates a second frequency signal in response to acceleration of the second flexure plate. A controller including receives the first frequency signal and the second frequency signal and generates an angular acceleration signal from a difference of the first frequency signal and the second frequency signal. The controller also generates a linear acceleration signal in response to an average of the first frequency signal and the second frequency signal. The controller also controls a missile system in response to the first frequency signal and the second frequency signal.

20 Claims, 5 Drawing Sheets

ANGULAR AND LINEAR FLEXURE PLATE ACCELEROMETER

BACKGROUND OF INVENTION

The present invention relates generally to capacitive accelerometers, and more particularly, to an angular and linear flexure plate accelerometer.

It is well known that capacitive accelerometers measure the acceleration, vibration and the inclination of objects to which they are attached. These objects typically include missiles, spacecraft, airplanes and automobiles.

In general, capacitive accelerometers change electrical capacitance in response to acceleration forces and vary the output of an energized circuit. Capacitive accelerometer systems generally include sensing elements, including capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

This type of accelerometer can be used in a missile or in a portion of aircraft or spacecraft navigation or guidance systems. Accordingly, the temperature in the operating environment of the accelerometer changes over a wide range. Consequently, acceleration must be measured with a high accuracy over a wide range of temperatures. This is often a difficult and inefficient process.

The disadvantages associated with current capacitive accelerometer systems have made it apparent that a new capacitive accelerometer is needed. The new accelerometer should substantially minimize temperature sensing requirements and should also improve acceleration detection accuracy. The present invention is directed to these ends.

SUMMARY OF INVENTION

In accordance with one aspect of the present invention, an accelerometer system includes an inertial platform maintaining a minimized rotation in response to a stabilizing controller signal. The accelerometer system further includes a rigid plate system coupled to the inertial platform and defining a reference plane, a spin axis, and a linear acceleration axis, wherein the spin axis is within the reference plane and the linear acceleration axis is perpendicular to the reference plane.

A first flexure plate defines a first flex axis and is adjacent to the rigid plate system a first distance from the spin axis. The first flexure plate generates a first frequency signal in response to acceleration of the first flexure plate.

A second flexure plate defines a second flex axis and is adjacent to the rigid plate system a second distance from the spin axis. The second flexure plate generates a second frequency signal in response to acceleration of the second flexure plate.

A controller including a first frequency control device and a second frequency control device receives the first frequency signal and the second frequency signal. The first frequency control device generates an angular acceleration signal from a difference of the first frequency signal and the second frequency signal. The second frequency control device generates a linear acceleration signal in response to an average of the first frequency signal and the second frequency signal. The controller further generates the stabilizing controller signal in response to the first frequency signal and the second frequency signal. The controller also controls a missile system in response to the first frequency signal and the second frequency signal.

In accordance with another aspect of the present invention, a method for operating an accelerometer system defining a z-spin axis includes generating a first frequency signal from a first flexure plate and generating a second frequency signal from a second flexure plate. The first flexure plate and the second flexure plate are controlled such that the first flexure plate and the second flexure plate remain in an xz-plane. The first frequency signal and the second frequency signal are averaged, and a linear acceleration signal is generated therefrom. The first frequency signal and a negative value of the second frequency signal are averaged and an angular acceleration signal is generated therefrom.

One advantage of the present invention is that it generates a dynamic range and granularity sufficient for Inter-Continental Ballistic Missile (ICBM) usage. Additional advantages include that the accelerometer system consumes less power than prior accelerometer systems, while dramatically improving reliability and reduction in manufacturing costs.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

The present invention is illustrated with respect to an angular and linear flexure plate accelerometer, particularly suited to the aerospace field. The present invention is, however, applicable to various other uses that may require accelerometers, such as any system requiring position and velocity measurements under extreme conditions, as will be understood by one skilled in the art.

Figure 1:
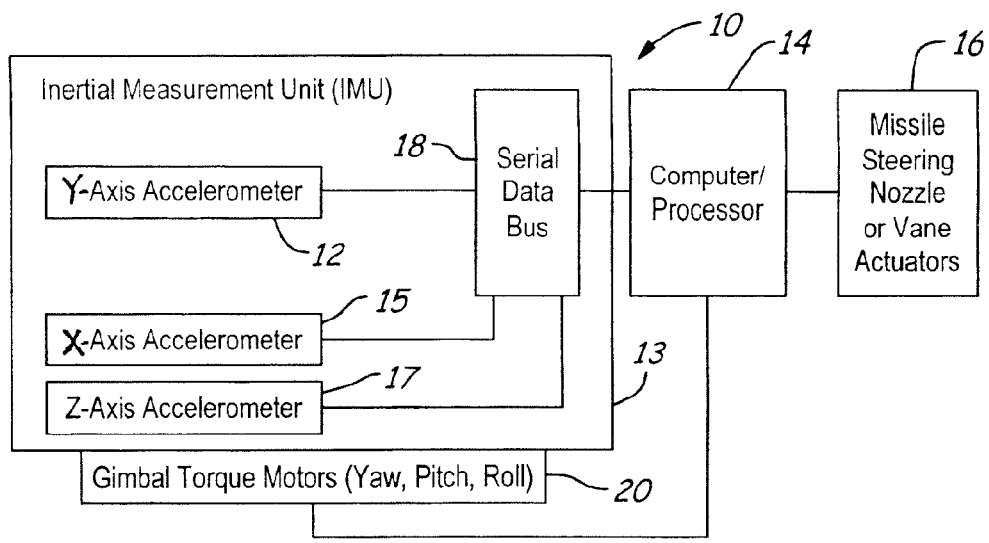
FIG. 1 illustrates an aerospace system including an accelerometer system in accordance with one embodiment of the present invention.

Referring to FIG. 1, the missile or aerospace system 10, including a angular and linear flexure plate accelerometer system 12 (ALFPA) within an inertial measurement unit 13, is illustrated. The aerospace system 10 is merely an illustrative example of an accelerating object and not meant to be limiting. For example, the present angular and linear flexure plate accelerometer 12 could be implemented in any accelerating object to sense acceleration forces, including any type of vehicle or missile system, such as a Minuteman III missile system or a Scud missile system.

The illustrated aerospace system 10 includes an inertial measurement unit 13 including three angular and linear flexure plate accelerometers (first) 12, (second) 15, (third) 17 and a serial data bus 18. The three accelerometers, the y-axis accelerometer 12, the x-axis accelerometer 15, and the z-axis accelerometer 17, are coupled to an inertial platform, such as gimbals and gimbal torque motors 20 (yaw, pitch and roll motors). The accelerometers 12, 15, 17 are also coupled to the serial bus 18, which transfers information to a computer/processor 14. The computer 14 is coupled to the missile steering nozzle (or vane actuators) unit 16 and the gimbal torque motors 20.

The angular and linear flexure plate accelerometer 12 is a single axis accelerometer that generates a robust wide dynamic range of performance. Important to note is that alternate embodiments of the present invention have one or more accelerometers, the three illustrated accelerometers 12, 15, 17 are only one example of a possible arrangement of accelerometers, and any number of accelerometers can be utilized.

Figure 2:
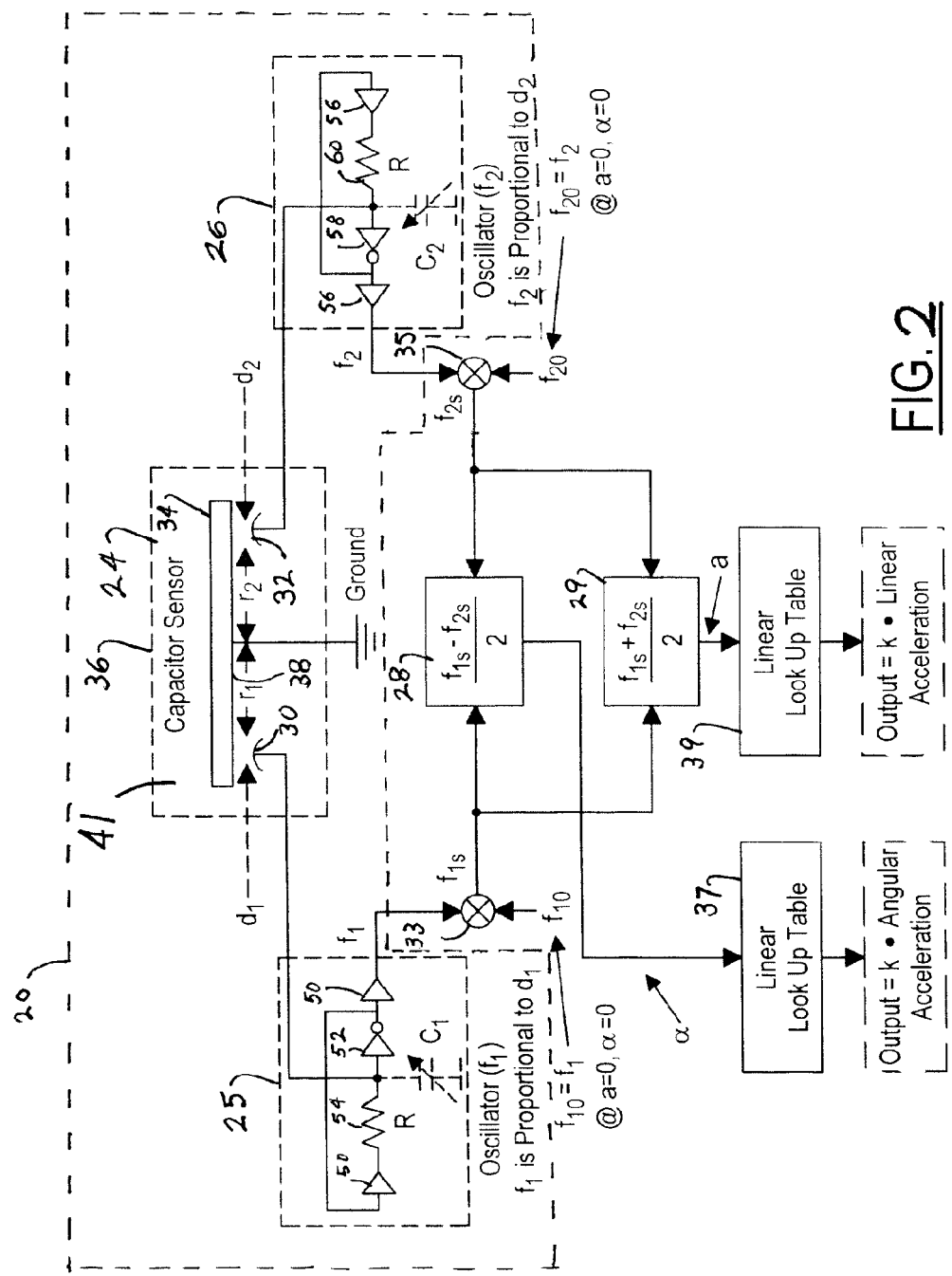
FIG. 2 illustrates an accelerometer system in accordance with FIG. 1.

Referring to FIGS. 1 and 2, an example of a possible configuration for the accelerometer system 12 is included as an illustrative example of the three accelerometers 12, 15, and 17. The accelerometer system 12 is part of an inertial measurement unit 13 (IMU), as was previously discussed. The accelerometer system 12 includes a shared capacitor sensor 24, two oscillators 25, 26, two frequency control devices 28, 29, which may also be part of the processor 14, two input controllers 33, 35 and two Linear Lookup Tables (LLT) or linearizers 37, 39.

The accelerometer system 12 includes an inertial platform 20 maintaining a minimized rotation in response to a stabilizing controller signal. The accelerometer system 12 further includes a rigid plate system 34 coupled to the inertial platform 20 and defining a reference xz-plane, a z-spin axis, and a y linear acceleration axis.

The shared capacitor sensor 24 includes two parallel flexure plates 30, 32, a rigid plate system 34, and a metal housing structure 36. The shared capacitor sensor 24 generates phase shift capacitance signals in response to acceleration of the aeronautical system 10, as will be discussed later.

The rigid plate system 34 is coupled to the shared capacitor sensor 24 and is here embodied as a single plate positioned in the xz-plane and having a z-spin axis. Important to note is that the rigid plate system may alternately be a plurality of rigid plates in parallel relation to the flexure plates 30, 32.

The first flexure plate 30, parallel to the xz-plane, defines a first flex axis, which is perpendicular to that plane and parallel to the y-axis and is adjacent to the rigid plate system 34 a first distance from the z-spin axis. The first flexure plate 30 generates a first frequency signal, $f_1$, in response to acceleration of the first flexure plate 30. The first flexure plate 30 is coupled to the metal housing structure 36 and positioned a first distance ($d_1$) from the flexure plate 30. The first flexure plate 30 and the rigid plate 34 form a first capacitor whose operation is also governed by the equation $$C \cong (\epsilon_0 A)/d.$$

The capacitance formed by the rigid plate 34 responds to movement of the first flexure plate 30 when $d_1$ either increases or decreases, thereby generating a first phase shift capacitance signal.

The second flexure plate 32 defines a second flex axis, parallel to the xz-plane, defines a second flex axis and is adjacent to the rigid plate system 34 a second distance from the z-spin axis. The second flexure plate 32 generates a second frequency signal, $f_2$, in response to acceleration of the second flexure plate 32.

The second flexure plate 32 is also coupled to the metal housing structure 36 and positioned a second distance ($d_2$) from the rigid plate 34. The second flexure plate 32 and the rigid plate 34 form a second capacitor whose operation is governed by the equation $$C \cong (\epsilon_0 A)/d.$$

The capacitance formed by the rigid plate 34 responds to movement of the second flexure plate 32 when $d_2$ either increases or decreases, thereby generating a second phase shift capacitance signal.

The flexure plates 30, 32 are positioned substantially parallel to one side of the rigid plate 34 such that the first flexure plate 30 is a first distance ($d_1$) from the side 38 of the rigid plate 34, and the second flexure plate 32 is a second distance ($d_2$) from the side 38 of the rigid plate 34. The flexure plates 30, 32 are affixed to the metal housing structure 36 through at least a portion of at least one edge of each of the flexure plates 30, 32. The rigid plate 34 is coupled to the housing structure 36 and to a ground 40. The plates, 30, 32, and 34 are embodied herein as coupled to one side 41 of the housing 36; however, numerous other attachment configurations are known in the art.

The flexure plates 30, 32 are rigidly fixed to the metal housing structure 36 through almost any manner known in the art. Resultantly, all the system flexure is generated within the flexure plates 30, 32, which generally increases reliability and robustness of the system 10. This, however, generates a non-linear output from the flexure plates 30, 32, which will be discussed regarding the linear lookup table linearizers 37, 39.

A gas or vacuum environment is enclosed within the sensor 24 through the metal housing structure 36 such that there is no interference with the movement of the flexure plates 30, 32 other than the acceleration of the system 10 along a perpendicular axis. During acceleration, the flexure plate 30 flexes according to the reaction force of Newton's second law of motion, force=mass×acceleration (F=ma), causing the distance between the flexure plates 30, 32 and the rigid plate 34 to vary, thus creating the two variable capacitors, one on each end of the rigid plate 34.

The combination of the first flexure plate 30 and the rigid plate 34 forms a first parallel plate capacitor, and the combination of the second flexure plate 32 and the rigid plate 34 forms the second parallel plate capacitor. The equivalent capacitor for the first parallel plate capacitor is illustrated in broken lines as $C_1$, and the equivalent capacitor for the second parallel plate capacitor is illustrated in broken lines as $C_2$.

The capacitance of the parallel plate capacitors is illustrated by $$C \cong (\epsilon_0 A)/d.$$

where
is the permittivity constant, A is the area of a flex plate 30, 32 (if I is the length of one side and the cross section of the plate is square, then $A=I^2$) and d is the effective distance between the rigid plate 34 and one of the flexure plates 30, 32.

The distances ($d_1$ and $d_2$) between the rigid plate 34 and the flexure plates 30, 32 are a function of acceleration and are proportional or equal when the system 10 is at rest. Each flexure plate 30, 32 is connected to a respective oscillator 25, 26, which generates the phase shift capacitance necessary for predictable oscillation and resultant frequency $f_1$, $f_2$ for the capacitors.

The distance, d, is the acceleration variable (F=ma) which determines oscillator frequencies, $f_1$ for the first oscillator 25 and $f_2$ for the second oscillator 26, and these frequencies are inversely proportional to the plate separation distances, $d_1$ and $d_2$.

As the flexure plates 30, 32 sense acceleration, either linear or angular-tangential (F=ma), each flexure plate 30, 32 deflects in response to the sum of the forces. Because the processor 14 maintains the flexure plates 30, 32 in the xz-plane, the total acceleration received by each flexure plate 30, 32 is the sum (a+α) of the linear acceleration (a) and the tangential acceleration (α). The flexure plate signals, which are phase shift capacitance signals, are received in the oscillators 25, 26. The oscillators 25, 26 are precision designs utilizing GaAs or similar material. The oscillators 25, 26 are also mounted on the metal housing structure 36 in the present embodiment.

The embodied first oscillator 25 includes components well known in the art. Although the embodied oscillator is a common oscillator type, one skilled in the art will realize that numerous other types of oscillators will also be adaptable for the present invention. The various components include, but are not limited to, two buffers, 50, an inverter 52, and at least one resistor 54. The first oscillator 25 receives the phase shift capacitance signal from the first flexure plate 30 and generates therefrom a frequency signal ($f_1$), which is inversely proportional to $d_1$.

The second oscillator 26 receives the phase shift capacitance signal from the second flexure plate capacitor and generates therefrom a second frequency signal ($f_2$), which is inversely proportional to $d_2$. The embodied oscillator 26 is similar to the first oscillator 25 and also includes a set of buffers 56, an inverter 58, and at least one resistor 60.

Output frequencies for the oscillators 25, 26 are $f_1=(a+\alpha)k$ and $f_2=(a-\alpha)k$. For equal distances of $r_1$ and $r_2$, the expression $f_1=k_1 a+k_2 \alpha$ and $f_2=k_3 a-k_4 \alpha$, where $k_1$ and $k_3$ are equal if $r_1=r_2$. Otherwise the frequencies $f_1$, $f_2$ are calculated or modeled for the exact expression.

For simplicity, the present embodiment includes an initialization frequency, $f_{1o}$ and $f_{2o}$, subtracted from the output of each oscillator 25, 26 at the input controllers 33, 35. This is for convenience and minimization of circuitry such that at null, where $a=0$ and $\alpha=0$, the output frequency is zero. Alternate embodiments are implemented without this feature and with additional circuitry. The generated outputs are $f_{1s}$ and $f_{2s}$. In the present embodiment or simplified case, $f_{1s}-f_{2s}=(k_2 \alpha)-(-k_4 \alpha)$ and therefore $\alpha=[(f_{1s}-f_{2s})/2]*k$, which is generated in the first frequency control device 28. Similarly, $f_{1s}+f_{2s}=(a+k_2 \alpha)+(a+-k_4 \alpha)$ and therefore a $=[(f_{1s}+f_{2s})/2]*k$, which is generated in the second frequency control device 29.

The circuitry shown in FIG. 2 generates and scales the sum and difference frequencies and applies them to linearizer circuits 37, 39, which may be lookup tables, to provide compensation for the non-linearities induced by the peculiar flexure characteristics of the flexure plates 30, 32 and other data path anomalies. The linearized angular and linear acceleration outputs are then represented by scaled digital words proportional to the linear accelerations in either direction along the y-axis and angular acceleration about the z-axis.

Two linearizers 37, 39 receive the overall frequency signals ($f_1$ and $f_2$). The linearizers 37, 39 compensates for both the nonlinear function generated from the frequency control devices 28, 29 and any manufacturing anomalies, as will be understood by one skilled in the art. The linearizer values are established in manufacturing through taking large samples of performance curves, as will be understood by one skilled in the art. The linearizer outputs are digital words having magnitudes proportional to the acceleration of the system 10 in either direction along an axis perpendicular to the flexure plates 30, 32.

Numerous alternate linearizers are also included in the present embodiment whereby a substantially linear function can be generated by compensating for nonlinear functions, for example, in the digital domain, a digital linearizer is included. The output of the linearizers 37, 39 are acceleration signals multiplied by constants (k).

Statistical filtering of the linearized data somewhere significantly above the maximum flexure frequency also occurs in either the linearizers 37, 39 or the processor 14 to reduce the overall noise impact on the system 10.

Important to note is that one embodiment of the present invention includes the three accelerometers 12, 15, and 17 each having a rigid plate, two flexure plates, a two oscillators, a frequency subtraction device, and a linearizer. The orientation of the flex axis of the accelerometers 12, 15, and 17 are orthogonal, however numerous alternate orientations are embodied herein, as will be understood by one skilled in the art.

The processor 14 receives the linearizer signals and generates a processor signal and response thereto. The controller or computer/processor 14 includes, in one embodiment, the first frequency control device 28 and the second frequency control device 29. The processor 14 receives the first frequency signal and the second frequency signal. The first frequency control device 28 generates an angular acceleration signal from a difference of the first frequency signal and the second frequency signal. The second frequency control device 29 generates a linear acceleration signal in response to an average of the first frequency signal and the second frequency signal. The processor 14 further generates the stabilizing controller signal in response to the first frequency signal and the second frequency signal. The processor 14 also controls a missile system in response to the first frequency signal and the second frequency signal. The processor 14 is embodied as a typical missile or airplane processor, as is familiar in the art.

The actuator, here embodied as missile steering nozzle or vane actuators 16 receives the processor signal and activates system components (e.g. object control devices) in response thereto. System components include for example, thrusters or attitude control devices.

Figure 3:
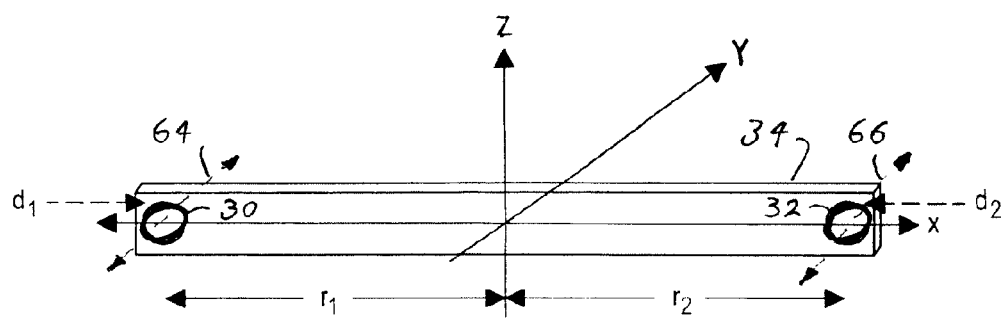
FIG. 3 illustrates a perspective view of an accelerometer system in accordance with FIG. 1.
Figure 4:
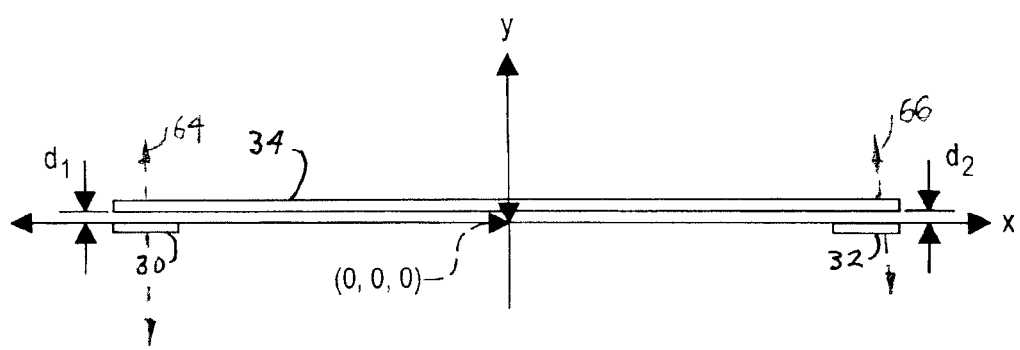
FIG. 4 illustrates a side view of the accelerometer system of FIG. 3.

Referring to FIGS. 3 and 4, the angular accelerometer 12 of FIG. 2 is further illustrated. The angular accelerometer 12 includes the two flexure plates 30, 32 and the fixed metal plate 34.

The first flexure plate 30 is positioned a distance $r_1$ from a central y-axis or the z-spin axis, and the second flexure plate 32 is positioned a distance $r_2$, from the central y-axis and the z-spin axis. Both flexure plates 30, 32 are represented as plates having flex axes 64, 66 parallel to the y-axis. Embodiments include multiple rigid plates or a single plate. The present embodiment, for simplicity, illustrates a single common rigid plate 34.

One embodiment of the present invention includes the faces of the plates in the xz-plane, perpendicular to the y-axis at distances $r_1$ and $r_2$ from the coordinate origin.

Numerous other arrangements are also included herein, such as the faces of the plates in the yz or xy planes for alternate configurations.

For the present invention, $r_1=r_2$. This is merely one embodiment, and in fact, they may be both on either side of the origin, as long as they are separated by a known distance, and at a known distance from the origin.

The accelerometers 12, 15, and 17 are herein included on an inertial platform. The platform may be a gimbal 20 or alternate inertial platform design known in the art. The system 10 utilizes the generated signals from the accelerometers 12, 15, 17 to control the platform position to maintain a near zero rotation.

Figure 5:
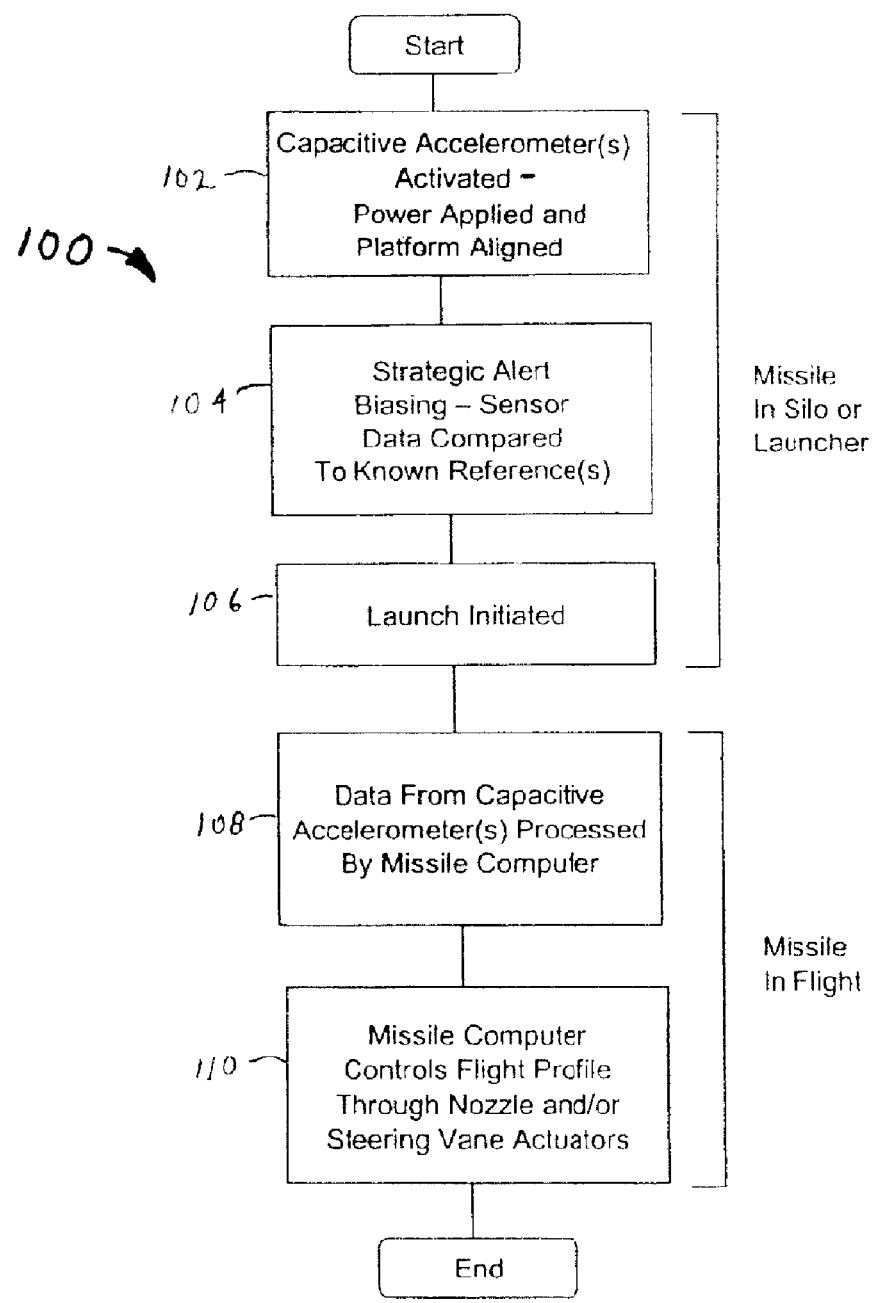
FIG. 5 illustrates a logic flow diagram of the aeronautical system of FIG. 1 in operation, in accordance with another embodiment of the present invention.

Referring to FIG. 5, a logic flow diagram 100 illustrating a method for acceleration control is illustrated. Logic starts in operation block 102 where power is applied to the guidance system, the missile alignment procedure is then activated.

In operation block 104, strategic alert biasing occurs and sensor data is compared to a known reference.

In operation block 106, the missile system 10 is launched.

In operation block 108, the missile system 10 accelerates and the flexure plate flexes to either increase or decrease $d_1$ or $d_2$ for any of the three accelerometers 12, 15, or 17. The oscillators activate and receive signals from the capacitors, which are generated in response to a change in either $d_1$ or $d_2$. Notably, a change in $d_1$ will always accompany a change in $d_2$ as their physical input is common. The oscillators 25, 26 then generate frequency signals in response to the rigid plate capacitor signals. The frequency from the first oscillator 25 is added and subtracted from the frequency from the second oscillator 26 to generate a nonlinear overall frequency signal proportional to linear and angular acceleration.

In operation block 108, the overall frequency signals, i.e. the results of the acceleration, are linearized. This linearization is achieved through a linear lookup table (linearizers 37, 39), or other linearization methods known in the art. Data from the accelerometer(s) is processed by the missile computer or attitude controller.

In operation block 110, aeronautical systems respond to the acceleration. In other words, the controller receives a signal indicating that acceleration of the system 10 has changed. In response to this change, for example, control devices are activated to compensate for the acceleration change. In other words, the missile computer/controller/processor 14 controls the flight profile through the missile nozzle or steering vane actuators 16.

In operation, a method for operating an accelerometer system defining a z-spin axis includes generating a first frequency signal from a first flexure plate and generating a second frequency signal from a second flexure plate. The first flexure plate and the second flexure plate are controlled such that the first flexure plate and the second flexure plate remain in an xz-plane. The first frequency signal and the second frequency signal are averaged, and a linear acceleration signal is generated therefrom. The first frequency signal and a negative value of the second frequency signal are averaged and an angular acceleration signal is generated therefrom.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. A dual capacitance accelerometer comprising:
   a housing;
   a first flexure plate coupled to said housing and defining a first flex axis;
   a second flexure plate fixed within said housing spaced apart from said first flexure plate and defining a second flex axis in parallel relation to said first flex axis;
   a rigid plate adjacent to and in substantially parallel relation to said first and second flexure plates, said rigid plate coupled to said housing, said rigid plate and said first flexure plate defining a first distance and said rigid plate and said second flexure plate defining a second distance,
   wherein said first distance varies in response to acceleration forces acting upon said first flexure plate thereby generating a first frequency signal from said first flexure plate and wherein said second distance varies in response to acceleration forces acting upon said second flexure plate thereby generating a second frequency signal from said second flexure plate; and
   a controller receiving said first frequency signal and said second frequency signal, said controller generating a linear acceleration signal in response to a fraction of a sum of said first accelerometer signal and said second accelerometer signal, said controller further generating an accelerometer stabilizing controller signal in response to said first frequency signal and said second frequency signal, thereby maintaining said first flexure plate and said second flexure plate in a common plane.

2. The system of claim 1, wherein said controller further generating an angular acceleration signal from a fraction of a difference of said first frequency signal and said second frequency signal.

3. The system of claim 1, wherein said controller controls a missile system in response to said first frequency signal and said second frequency signal.

4. The system of claim 1 further comprising a first input controller, wherein said first input controller subtracts a first initialization frequency from said first frequency signal.

5. The system of claim 1 further comprising a second input controller, wherein said second input controller subtracts a second initialization frequency from said second frequency signal.

6. The system of claim 1, further comprising a first oscillator generating said first frequency signal in response to variations in said first distance.

7. The system of claim 1 further comprising a second oscillator generating said second frequency signal in response to variations in said second distance.

8. A method for operating an accelerometer system defining a z-spin axis comprising:
   generating a first frequency signal from a first flexure plate and a rigid plate along a first flex axis;
   generating a second frequency signal from a second flexure plate and said rigid plate along a second flex axis parallel to and spaced a distance from said first flex axis;
   controlling an inertial platform such that said first flexure plate and said second flexure plate remain in an xz-plane;
   averaging said first frequency signal and said second frequency signal; and
   generating a linear acceleration signal.

9. The method of claim 8 further comprising compensating for non-linearities within said linear acceleration signal.

10. The method of claim 8 further comprising generating a digital word proportional to an angular acceleration around a z-axis.

11. The method of claim 10 further comprising activating an object control device in response to said linear accelerations signal.

12. The method of claim 8 further comprising averaging said first frequency signal and a negative value of said second frequency signal and generating an angular acceleration signal.

13. The method of claim 12, wherein averaging said first frequency signal and a negative value of said second frequency signal further comprises generating a difference of amplitudes of said first frequency signal and said second frequency signal.

14. The method of claim 8 further comprising compensating for non-linearities within said angular acceleration signal.

15. The system of claim 8 further comprising subtracting a first initialization frequency from said first frequency signal, and subtracting a second initialization frequency from said second frequency signal.

16. An accelerometer system comprising:
- an inertial platform maintaining a minimized rotation in response to a stabilizing controller signal;
- a rigid plate system coupled to said inertial platform and defining a reference plane, a spin axis, and a linear acceleration axis, wherein said spin axis is within said reference plane and said linear acceleration axis is perpendicular to said reference plane;
- a first flexure plate defining a first flex axis, said first flexure plate adjacent to said rigid plate system a first distance from said spin axis, said first flexure plate generating a first frequency signal in response to acceleration of said first flexure plate;
- a second flexure plate defining a second flex axis, said second flexure plate adjacent to said rigid plate system a second distance from said spin axis, said second flexure plate generating a second frequency signal in response to acceleration of said second flexure plate; and
- a controller comprising a first frequency control device and a second frequency control device, said controller receiving said first frequency signal and said second frequency signal,
- said first frequency control device generating an angular acceleration signal from a difference of said first frequency signal and said second frequency signal, said second frequency control device generating a linear acceleration signal in response to a sum of said first frequency signal and said second frequency signal,
- said controller further generating said stabilizing controller signal in response to said first frequency signal and said second frequency signal, and
- said controller controlling a missile system in response to said first frequency signal and said second frequency signal.

17. The system of claim 16, wherein said first flex axis and said second flex axis are perpendicular to said linear acceleration axis.

18. The system of claim 16, wherein said rigid plate system comprises a single rigid plate or a plurality of rigid plates arranged in an electrically dynamic relation to said first flexure plate or said second flexure plate.

19. The system of claim 16 further comprising a first input controller and a second input controller, wherein said first input controller subtracts a first initialization frequency from said first frequency signal, and said second input controller subtracts a second initialization frequency from said second frequency signal.

20. The system of claim 16, wherein said controller further comprises a first linearizer linearizing said angular acceleration signal and wherein said controller further comprises a second linearizer linearizing said linear acceleration signal.

* * * * *